Figures 1, 2:
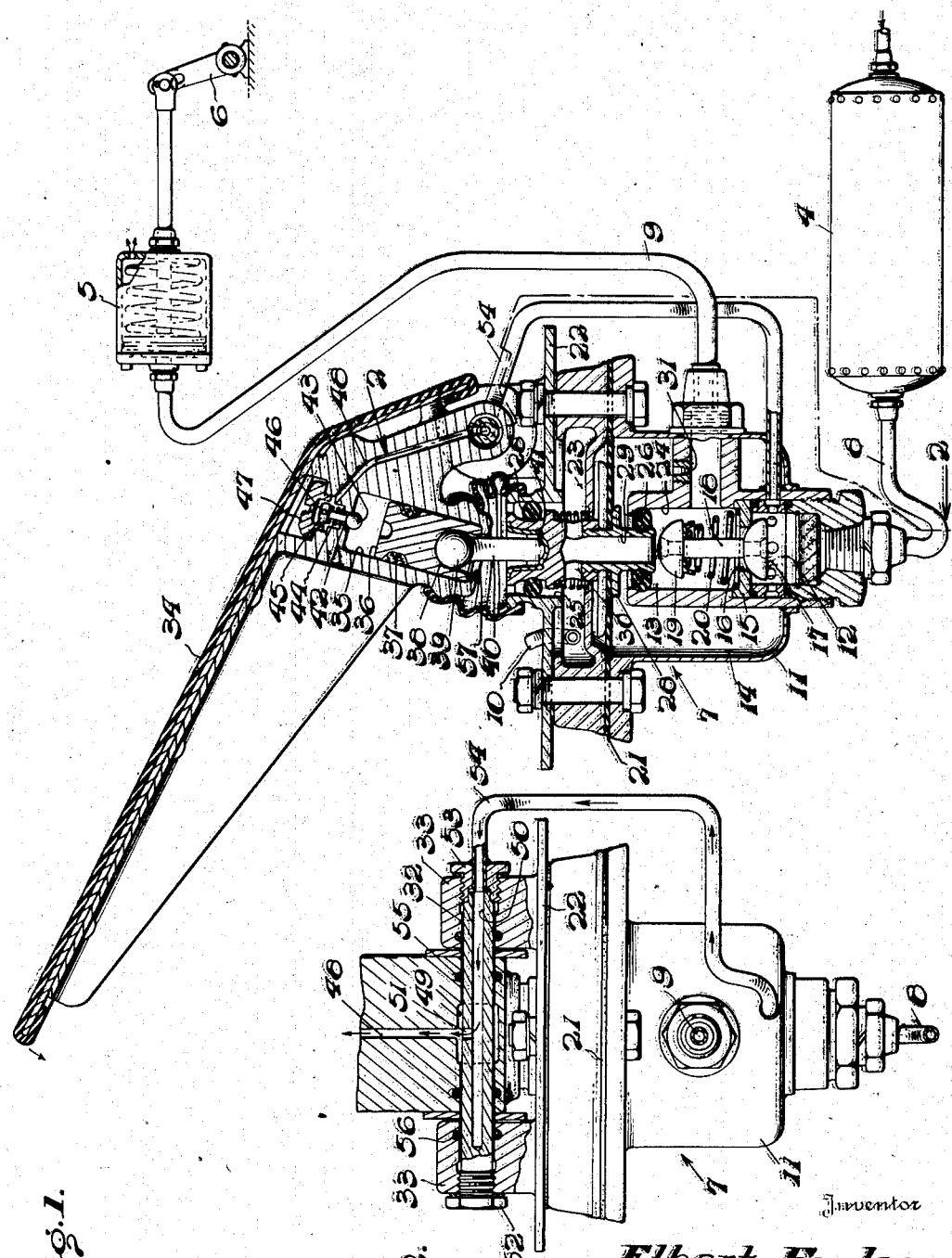

Nov. 28, 1944.  E. FOWLER  2,363,664
BRAKE CONTROL MECHANISM
Filed May 1, 1943

Inventor
Elbert Fowler
By N. D. Parker Jr.
Attorney

Patented Nov. 28, 1944

2,363,664

UNITED STATES PATENT OFFICE 2,363,664

BRAKE CONTROL MECHANISM

Elbert Fowler, Mount Vernon, N. Y., assignor to Bendix-Westinghouse Automotive Air Brake Company, Elyria, Ohio, a corporation of Delaware Application May 1, 1943, Serial No. 485,350

10 Claims. (Cl. 303—54)

This invention relates to control valve mechanisms and more particularly to remotely controlled fluid pressure operated mechanisms especially adaptable for use in connection with motor vehicles.

It has heretofore been proposed to employ fluid pressure control valve mechanisms of the self-lapping type for controlling the pressure of fluid in a fluid pressure actuator wherein the operation of the valves in the valve mechanism has been controlled by means of a pressure responsive member responsive to the pressure in the actuator and an operator-controlled resilient means such as a spring which operates to oppose the force exerted by the pressure-responsive member, this construction permitting the resilient member or spring to be adjusted by the operator in such a manner that, acting in cooperation with the pressure responsive member, the spring operates to control the lapping of the valve mechanism to establish and maintain a predetermined pressure in the actuator which is proportional to the degress of compression of the spring. It is characteristic of a spring or other normally used resilient means, however, that the force exerted by the spring is directly proportional to the degree of compression thereof, this action resulting in a pressure in the actuator which is directly proportional to the degree of displacement or compression of the spring by the operator, and consequently proportional to the degree of displacement of the control pedal or lever provided for the control of the valve mechanism. It has been found desirable in some applications, however, to provide control valve mechanism wherein the pressure in the actuator is proportional to the degree of displacement of the operator-controlled pedal, but not directly proportional as is the case when a spring is used for the resilient member, and it is accordingly an object of the present invention to provide means for controlling a valve mechanism of this general type, so constituted as to permit control of the valve to deliver a pressure to the actuator proportional to the degree of displacement of the operating pedal, but variably proportional in accordance with certain fixed laws rather than directly proportional as is the case when the ordinary resilient means is utilized.

A further object of the invention is to provide in a control valve mechanism of the above type, means providing for relatively large pedal displacements when low pressures are supplied to the actuator and a progressively decreasing displacement for each subsequent equal increase in the pressure supplied to the actuator.

Yet another object of the invention is to provide in a valve mechanism of the above described type, means for supplying an initial pressure to the actuator independent of the degree of pedal displacement, subsequent increments of pressure delivered to the actuator being proportional to the subsequent pedal displacement in accordance with the principles set in the preceding paragraph.

Still another object of the invention is to provide in a control valve mechanism of the self-lapping type, a resilient fluid pressure spring for controlling the operation of the valve mechanism.

A further object of the invention is to provide in connection with a fluid pressure spring of the above referred to type, novel and simple means for insuring a constant supply of fluid pressure to the spring.

These and other objects and novel features of the invention will appear more fully hereinafter from the following detailed description when taken in connection with the accompanying drawing. It is to be expressly understood, however, that the drawing is employed for purposes of illustrations only and is not designed as a definition of the limits of the invention, reference being had for this purpose to the appended claims.

In the drawing, wherein similar reference characters refer to similar parts throughout the several views:

Fig. 1 is a view, partially in section, of a fluid pressure control system embodying a fluid pressure control valve mechanism constructed in accordance with the principles of the present invention, and Fig. 2 is a fragmentary view, partially in section, taken along line 2—2 of Fig. 1.

Referring more particularly to Fig. 1, the invention is disclosed therein as embodying a fluid pressure control system including in general a reservoir 4, a fluid pressure actuator 5 for actuating a suitable vehicle controlling element 6 and a self-lapping control valve mechanism 7 for controlling the pressure of fluid in the actuator. The valve mechanism 7 receives fluid pressure from the reservoir through conduit 8, the valve mechanism in turn being connected with the actuator 5 through the medium of a conduit 9 interconnected there-between, and it will be understood by those skilled in the art that the valve mechanism 7 may be controlled by the operator to supply fluid pressure from the reservoir 4 to the actuator 5 to establish any desired pressure in the actuator, and that the control valve may be further operated to exhaust fluid pressure from the actuator 5 to atmosphere through the conduit 9, the valve 7, and an exhaust conduit 10 connected with the valve mechanism 7, in a manner to be later described.

The control valve mechanism 7 is provided with a casing 11 having an inlet chamber 12, an outlet chamber 13 and a diaphragm chamber 14 as shown. The chambers 12 and 13 are separated by means of a partition 15 provided with a port 16 there-through, the port being normally closed by means of a valve 17 provided with a stem 18 having an exhaust valve 19 formed on its upper end, the valve being normally maintained in closed position by means of a suitable spring 20 interposed between the lower face of the exhaust valve and the upper surface of the partition 15. The upper end of the chamber 14 is closed by means of a flexible diaphragm 21 clamped between the upper surface of the casing 11 and a suitable cover plate 22, the cover plate being provided with an exhaust chamber 23 connected with atmosphere through the medium of the conduit 10 previously referred to. A bore 24 formed in the outlet chamber 13 and a bore 25 formed in the cover plate are each provided with circular rings of rubber-like material 26, these rings serving to support a valve operating element 28 for sliding movement with respect to the bores, the valve operating element being provided with a central bore 29 having a connection with the exhaust chamber 23 through the medium of ports 30 formed therein. In order that the diaphragm 21 may be responsive to the pressure in the outlet chamber 13, a restricted passage 31 is provided in the wall of the outlet chamber 13, and it will be understood that on downward movement of the valve actuating element 28 under the control of means later to be described, the lower end of the bore 29 will first contact the upper face of the exhaust valve 19, thus preventing communication between the outlet chamber 13 and atmosphere through the bore 29, port 30, chamber 23 and conduit 10, further downward movement of the element 28 serving to move the inlet valve 17 downward to permit passage of fluid pressure from the inlet chamber 12 to the outlet chamber 13, and thence to the actuator 5 through the conduit 9. As the pressure builds up in the outlet chamber and in the diaphragm chamber 14, the action of this pressure on the diaphragm 21 tends to move the latter and the valve actuating element 28 upward to a point where the intake valve closes, and in the event the actuation of the element 28 is accomplished through the medium of a resilient member or connection, it will be understood that when the force acting upward on the diaphragm balances the force exerted by the resilient member, the valve mechanism will be in so-called lapped position, the intake valve and exhaust valves both being in closed position.

In order that the valve actuating element 28 may be controlled by the operator, a pivot pin 32 is provided and mounted in brackets 33 carried by the cover plate 22, this pivot pin serving to provide a pivotal mounting for an operator's control pedal 34. To provide a resilient connection between the operator's pedal 34 and the valve actuating element 28, a cylinder 35 is formed in the body of the pedal having a piston 36 slidably mounted therein, the piston being provided with a sealing member or ring 37 in sealing engagement with the wall of the cylinder. The lower end of the piston 36 is provided with a spherically shaped socket 38, adapted to receive the spherically shaped end 39 of a rod 40 serving to provide a connection between the piston and the valve actuating element 28, the lower end of the rod engaging a socket 41 formed in the upper end of the element. The upper end of the cylinder 35 is provided with an outlet port 42, this port being normally closed by means of a check valve 43 normally maintained in position by means of a spring 44 interposed between the pedal structure and a shoulder 45 formed at the upper end of the valve. Thus, assuming that parts are assembled with fluid at atmospheric pressure in the cylinder 35, it will be understood that on downward movement of the pedal 34, the cylinder 35 will tend to move downward with respect to the piston 36, thus compressing fluid between the piston and the cylinder and building up a force which is imparted to the valve actuating element 28 through the medium of the connecting rod 40.

Since the use of a compressible fluid is contemplated in the cylinder 35, it will be understood that in view of the nature of fluid compression, the force built up on the rod 40 during initial relative movement of the piston and cylinder will be comparatively small, but will increase very rapidly as the volume between the piston and the cylinder walls is decreased, thus insuring a long pedal travel in relation to the force imparted to the valve actuating member when it is desired to control the valve mechanism for the transmission of comparatively low pressures to the actuator, the pedal travel necessary to obtain additional increments of pressure in the actuator 5 decreasing materially as the pedal is operated to establish each increment of pressure.

It has been found desirable in the past in connection with valve mechanisms of the self-lapping type in some instances to provide means for supplying a substantial pressure to the actuator immediately on depression of the foot pedal, and in connection with previous types of valves, this desirable end has been accomplished by pre-compressing the resilient element or spring which serves as a connecting link between the operator's pedal and the valve actuating element, this spring ordinarily being held in a cage, and compressed to such an extent that, on initial operation of the control pedal, the pressure in the chamber 14 acting to move the diaphragm upward and lap the valves will not be sufficient to do this until it exerts a force equal to the degree of pre-compression of the spring. In connection with the resilient means disclosed in the instant invention, wherein a fluid compressor is used in place of a graduating spring, means have likewise been provided whereby the fluid compresser serving to actuate the valve actuating element is arranged to provide the same preloading effect as would be obtained in the event a pre-compressed spring were used, and in the present instance this is accomplished by maintaining the pressure in the cylinder 35 at all times above atmospheric pressure, so that a force dependent on the degree of this pressure and the area of the piston 36 will be effective to immediately open the intake valve on operation of the control pedal 34, and to maintain the valve in open position until such time as the force exerted by the pressure acting upward on the diaphragm 21 is sufficient to overcome force exerted by the pressure acting on the piston 36 and to move it inward with respect to the cylinder 35.

This desirable result is accomplished by establishing a connection between the source of fluid pressure as supplied to the inlet chamber 12, and the cylinder 35, the area of the piston 36 being so chosen in connection with this pressure as to provide the necessary preloading effect. To this end, the body of the pedal above the valve port 42 is provided with a chamber 46, the upper end of this chamber being closed by means of a suitable cap nut 47. A passage 48 is provided in the body of the pedal member, being connected at its upper end with the chamber 46 and at its lower end with an annular groove 49 formed in the hub of the pedal, and shown in more detail in the Fig. 2 of the drawing. The pivot pin 32 is provided with a hollow bore 50, this bore being connected with the annular groove 49 by means of a port 51 in the wall of the bore 50. The pivot pin is maintained in the brackets 33 by means of nuts 52 and 53, the nut 52 serving to prevent the escape of fluid pressure between the junction of the left bracket 33 and the nut, and the nut 53 being formed as a coupling member for a conduit 54, which is thus placed in communication with the bore 50 of the pivot pin 32. In order to prevent the escape of fluid pressure around the joint between the pedal and the pivot pin and between the pivot pin and the brackets 33, sealing rings 55 are mounted in the hub of the pedal around the pivot pin and sealing rings 56 are mounted in like manner in the brackets 33. As shown more particularly in Fig. 1, the lower end of the conduit 54 is connected with the inlet chamber 12, fluid under pressure thus being free to pass from the inlet chamber 12 to the cylinder 35 at all times through the conduit 54, the bore 50 and port 51 of the pivot pin, the annular groove 55 in the pedal, the passage 48, the chamber 46 and the valve port 42, the valve spring 44 being of such light construction that whenever the pressure in the cylinder 35 is less than that in the chamber 46, the pressure of the fluid in the chamber 46 opens the valve and permits the establishment of substantially reservoir pressure in the cylinder.

Thus it will be seen that the piston 36 is maintained under pressure at all times with a resultant preloading effect on the fluid compressor comprising the piston and cylinder, and in order to prevent downward movement of the piston with respect to the cylinder and consequent operation of the valve mechanism when the pedal is in fully released position, the lower end of the cylinder is provided with a shoulder 57 which engages the lower end of the piston and prevents such movement.

On initial operation of the brake pedal 34, the valve actuating element 28 is moved downward with a force equal to that exerted on the piston 36 by the fluid pressure in the cylinder 35, closing the exhaust valve and opening the intake valve to establish communication between the reservoir and the actuator through conduit 8, inlet chamber 12, inlet port 16, outlet chamber 13 and conduit 9, the pressure at the same time building up in the diaphragm chamber 14 throught the choke 31. As soon as the pressure in this chamber is sufficient to move the diaphragm upward against the force exerted on the piston 36 by the fluid pressure in the cylinder 35, the diaphragm acts to move the valve to lapped position until such time as the pedal is further depressed, whereupon the fluid in the cylinder 35 is further compressed, the increased pressure exerting an additional force on the piston 36 which is applied to the element 28 through the rod 40 to again actuate the valves to further increase the pressure in the actuator. During this operation, the fluid is prevented from escaping from the cylinder 35 by means of the check valve 43 as heretofore explained.

There has thus been provided by the present invention, a self-lapping control valve mechanism of the graduating type, wherein the pressure delivered by the valve mechanism, instead of being directly proportional to the degree of movement of the control pedal as is the case in ordinary valves of this type wherein a graduating spring is used to connect the pedal with the valve actuating element, is proportional to the increase in pressure occurring in the cylinder 35 due to displacement of the control pedal, the movement of the pedal for initial small increments of pressure being much greater than the corresponding movements for subsequent increments of pressure, a mode of operation which tends to prevent sudden and severe application of pressure to the fluid actuator 5 when the mechanism is used to operate the brakes of a vehicle, for example. In addition to the above, the application of pressure from the reservoir to the cylinder 35 effects the desirable preloading effect now utilized on more conventional valves.

While the invention has been illustrated and described herein with considerable particularly, it is to be understood that the same is not limited to the form shown, but may receive a variety of mechanical expressions as will readily appear to those skilled in the art. Reference will, therefore, be had to the appended claims for a definition of the limits of the invention.

What is claimed is:

1. The combination in a fluid pressure brake system having a source of fluid pressure, an actuator, and valvular means for controlling the flow of fluid pressure from said source to said actuator including a valve for controlling the establishment of a connection between said source and actuator and means responsive to the pressure in said actuator for controlling the operation of said valve in one direction, of operator-controlled means for controlling the operation of said last named means for controlling the operation of the valve in the other direction including a pressure-responsive member for imparting force to said pressure responsive means, operator-controlled means movable relative to said pressure-responsive member for varying the pressure thereon and forming a pressure chamber therewith, means connecting said chamber and source for maintaining the pressure acting on said pressure-responsive member at a value at least equal to that of the source and means for preventing movement of the pressure responsive member by the pressure in said chamber when the operator-controlled means is in release position.

2. The combination in a fluid pressure control system having an actuator, a source of fluid pressure, and a control valve mechanism for controlling the flow of fluid pressure between said source and actuator comprising a valve, an element for actuating said valve in one direction, means for moving said valve in the opposite direction, means responsive to the pressure in said actuator for controlling the operation of said element in one direction, and operator-controlled means for controlling the operation of said element in said other direction, of means connecting said operator-controlled means and element for transmitting force therebetween in one direction including a pressure responsive member connected to the operator-controlled means and a pressure-responsive member connected to the valve operating element forming a pressure chamber between said last named members, and means connecting said chamber and source for maintaining a pressure on said last named pressure responsive members at a value at least equal to that obtaining at the source and for insuring compression of the fluid in said chamber when the operator-controlled means is operated to transmit force to said valve operating element.

3. Fluid pressure control valve mechanism of the self-lapping type including inlet and outlet chambers, a valve for controlling the flow of fluid pressure between said chambers, a valve actuating element for moving said valve in one direction to establish a connection between said chambers, means associated with said valve for moving said valve in the opposite direction, means associated with said valve actuating element and responsive to the pressure in said outlet chamber for moving said valve actuating element in one direction to permit closing of the valve, and operator-controlled means for controlling the operation of said valve actuating element in the other direction including a pressure-responsive member adapted for actuation by the operator, a pressure responsive member having a connection with the valve actuating element and forming a pressure chamber between said members, means for subjecting said chamber to the pressure in said inlet chamber and means for preventing movement of the second named member by the pressure in said chamber to move the element when the operator-controlled means is in released position.

4. Fluid pressure control valve mechanism comprising a casing, a partition therein formed with an intake valve port, said partition dividing the casing into inlet and outlet chambers, an exhaust valve in the outlet chamber, an intake valve in the intake chamber, means inter-connecting said valves, means cooperating with said valves for normally maintaining said intake valve in port closing position, a valve actuating element formed with an exhaust passage, means for moving said element into contact with said exhaust valve to close said passage and to move the latter to open the intake valve through said inter-connecting means including a pair of relatively movable pressure-responsive members, one of said members having a connection with the valve actuating element and the other of said members being adapted for actuation by the operator, means for subjecting said last named pressure-responsive members to the pressure in the inlet chamber, means associated with said valve actuating element and responsive to the pressure in the outlet chamber for opposing valve actuating movement of said element under the action of said operator-actuated means, and means operable on relative movement of said pair of pressure-responsive members for insuring the compression of fluid therebetween, whereby the force exerted on said valve actuating element is initially equal to the force directly proportional to the initial pressure acting thereon and is thereafter proportional to the relative movement of said members.

5. The combination in a fluid pressure control valve mechanism having control valves and means responsive to the pressure delivered by the valve for controlling the operation of the valves in one direction, of operator-controlled means for controlling the operation of the valves in the other direction including a pair of pressure-responsive members defining a compression chamber, means for connecting one of said members with said pressure-responsive means, means for effecting operation of said other pressure-responsive member by the operator-controlled means for compresing the fluid in said chamber and increasing the force exerted on said one member in one direction, means for maintaining the initial pressure in said chamber at all times at a value greater than atmospheric pressure and means for preventing movement of said one member in said one direction by the pressure in said chamber when the operator-controlled means is in release position.

6. In a fluid pressure control valve mechanism of the self-lapping type having an inlet chamber, a valve for controlling the flow of fluid pressure from the inlet chamber therethrough, means for moving said valve in one direction for preventing the flow of fluid pressure therethrough and means including a valve actuating element for moving said valve in the other direction to permit the flow of fluid pressure therethrough, means responsive to the pressure delivered by the valve for moving said element in valve closing direction, means for moving said element in the opposite direction including an operator-controlled pressure-responsive member and a second pressure-responsive member connected with the valve actuating element forming a compression chamber between the members and movable with respect to the operator-controlled element for compressing fluid therebetween and imparting a force to said valve actuating element in accordance with the degree of relative movement of said pressure-responsive members and means for supplying fluid pressure from the inlet chamber to said compression chamber whenever the pressure in the latter is less than the pressure in the inlet chamber.

7. In a fluid pressure control valve mechanism of the self-lapping type wherein a valve is provided movable in one direction for permitting the flow of fluid pressure therethrough and movable in the opposite direction for preventing the flow of fluid pressure therethrough and having a valve actuating element for controlling the operation of said valve, means responsive to the pressure delivered by said valve for moving said element in one direction, and operator controlled means for moving said element in the other direction to move the valve to open position including a fluid compressor having an operator-controlled portion and a portion relatively movable with respect thereto connected with the valve actuating element and defining a compression chamber between said portions, means for normally supplying a pressure greater than atmospheric pressure to said chamber, and means for preventing the escape of fluid pressure from said chamber regardless of the relative positions of said compressor portions.

8. The combination in a fluid pressure control system having a source of fluid pressure, a fluid pressure actuator, means including a valve mechanism for controlling the flow of fluid from said source to said actuator, and an operator-controlled element for controlling the operation of said valve mechanism, of resilient means for connecting said element and valve mechanism including a fluid compressor having a pair of relatively movable members defining a compression chamber, means for supplying fluid to said chamber from said source, and means for preventing the flow of fluid from said chamber to said source regardless of the positions of said relatively movable members.

9. The combination in a fluid pressure control valve mechanism having a control valve and means responsive to the pressure delivered by the valve mechanism for controlling the operation of the valve in one direction, of operator-controlled means for controlling the operation of the valve in the other direction including a pair of pressure responsive members defining a compression chamber, means for connecting one of said members with said pressure-responsive means, means for connecting said other member with the operator-controlled means, means for maintaining the pressure in said chamber at a value above atmospheric pressure, and means for preventing actuation of said pressure-responsive means by said one member under the action of said pressure in said chamber when the operator-controlled means is in released position.

10. Fluid pressure control valve mechanism of the self-lapping type having a casing provided with inlet and outlet chambers, a valve for controlling the flow of fluid pressure between said chambers, a valve actuating element for moving said valve in one direction to establish a connection between said chambers, means for moving said valve in the opposite direction, means responsive to the pressure in said outlet chamber for moving said element in said opposite direction to permit closing of the valve, operator-controlled means movably mounted with respect to said casing and movable for controlling the movement of said element in said one direction, force transmitting means interposed between said operator-controlled means and element including a pair of relatively movable pressure responsive members defining a compression chamber therebetween and means for supplying fluid under pressure to said compression chamber from said inlet chamber through said operator-controlled means.

ELBERT FOWLER.